No. 878,308. PATENTED FEB. 4, 1908.
A. PATESSON.
PROCESS FOR THE MANUFACTURE OF MAPS IN COLORS AND IN RELIEF.
APPLICATION FILED AUG. 19, 1907.
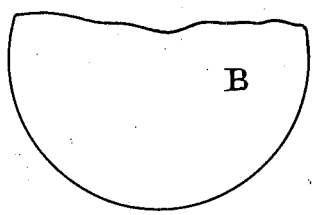
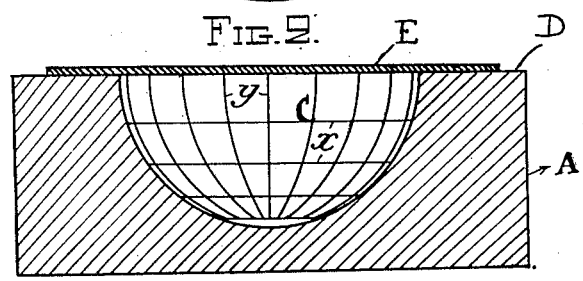
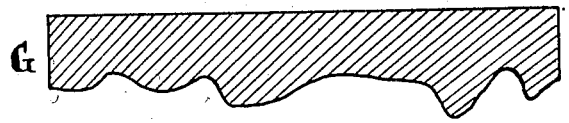
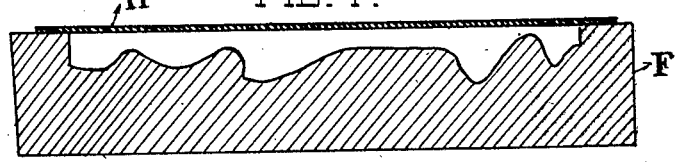
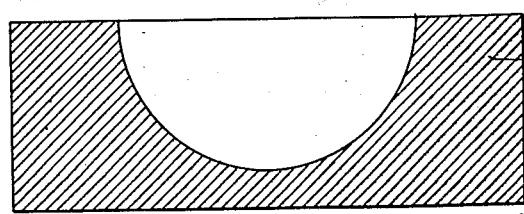
WITNESSES
P. H. Blair.
J. B. Langford.
INVENTOR
André Patesson
by Howson and Howson
Attorneys

UNITED STATES PATENT OFFICE.

ANDRÉ PATESSON, OF UCCLE, BELGIUM.

PROCESS FOR THE MANUFACTURE OF MAPS IN COLORS AND IN RELIEF.

No. 878,308.     Specification of Letters Patent.     Patented Feb. 4, 1908.

Application filed August 19, 1907. Serial No. 389,151.

*To all whom it may concern:*

Be it known that I, ANDRÉ PATESSON, a subject of the King of Belgium, residing at 23 Avenue de Longchamps, Uccle, Belgium, mapmaker, have invented a certain new and useful Improved Process for the Manufacture of Maps in Colors and in Relief, of which the following is a specification.

This invention relates to an improved process of an inexpensive nature for the accurate production of globular and plane geographical maps and the like printed on caoutchouc in colors and when desired in relief also.

In the accompanying sheet of drawings Figure 1 is an elevation of a globular die or countermold; Fig. 2. is a sectional view of a hemispherical press mold for the production of globular maps without relief; Fig. 3. and Fig. 4. are sectional views, respectively, of a counter-mold and a press mold to be used when the map or globe to be produced is to show relief and Fig. 5 is a sectional elevation of the finishing mold.

To explain the invention, the process will be described with reference to the manufacture of one or more copies of two hemispherical globular maps in one or more colors without relief, which will only require putting together in order to constitute a complete globe; but it will, however, be understood that the operation will be the same when it is required to represent by a map, globular or plane, a small portion only of the terrestrial or celestial globes.

Use is made of a press mold A, Fig. 2, formed of some suitable plastic material wherein is a cavity C corresponding in size to the hemispherical map to be made, and of a counter-mold B, Fig. 1, B having a diameter slightly smaller than that of the cavity C.

On the surface forming the hemispherical cavity C a series of circles or contours $x$ are engraved, parallel to the upper surface D of the mold, which may be taken to correspond to the equator, the series of circles extend from the top down to the bottom of the cavity C, which may be taken to correspond to the one of the terrestrial poles; in addition a series of half meridians $y$, that is to say, lines extending from the edge of the cavity to the bottom thereof are also engraved. The number of these lines will vary, according as it is desired to obtain a more or less closely drawn network of lines. In these engraved lines there is placed any suitable coloring matter of an adhesive nature, such as printers ink, paint, red chalk or the like.

Across the cavity C and over a portion of the upper surface of the mold there is fixed free from tension in some convenient manner a flat sheet of caoutchouc E of uniform thickness and resistance. Pressure is then applied to this sheet of caoutchouc by means of the spherical counter-mold B in such a manner as to cause the sheet to come into close contact with the whole surface of the cavity and thereby receive an imprint of the spherical network that is engraved on the surface of the said cavity. Some very small holes may be formed, if necessary, in the bottom of the mold A for the escape of air. On removing the countermold B the sheet of caoutchouc, by reason of its elasticity, resumes its flat shape and then will accordingly bear a flat and distorted projection of the spherical network above referred to; the same projection as would be got by any of the other processes employed in mapmaking.

The flat network surface is then employed as a guide or templet for drawing all the geographical features such as coasts, rivers, roads, railways, inscriptions and the like, which are to appear on the map. The drawing thus made is then transferred on to stone, zinc, copper and the like by the usual printing processes employed for producing a number of copies.

The reproductions of the drawing are printed in one or more colors on sheets of caoutchouc having the same coefficient of elasticity as the original sheet. If only one map is required the reproduced drawings would be unnecessary for the subsequent operations, as the original sheet can be used. When these reproductions or copies have been made one of the sheets is accurately fixed above a cavity of a finishing mold $A^1$ which is exactly similar to the press-mold A, except that no horizontal or parallel circles and meridians have been drawn on the surface forming the cavity. Pressure is then applied by means of a spherical presser made of any suitable strong material such as papier-mâché, card-board, hardened caoutchouc, metal or the like, which has been previously coated with a suitable adhesive substance. This presser serves as the core for the globular map being produced.

It will be readily conceived that the pressure exerted upon the printed sheet of caoutchouc, will cause the geographical drawing to take up its proper position on the presser or core as the printed drawing is made to occupy exactly the same position on the finishing mold as the imprinted caoutchouc sheet did on the press mold A when it had regained its flatness. As soon as the adhesive material has taken a firm hold of the sheet, the supporting core bearing the printed sheet of caoutchouc may be removed. The operation is repeated with the other hemisphere, by utilizing of course printed sheets bearing the geographical features of the other hemisphere, and in this manner there is obtained a whole terrestrial globe.

It will be readily understood that the process, instead of being employed for maps corresponding to a hemisphere, will be exactly similar in the case of the representation of a smaller portion of the terrestrial globe and also in the case of forms other than spherical. It is also obvious that in the process of manufacture the thickness of the sheets of caoutchouc will have to be taken into consideration in determining the size of the core.

For the purpose of producing maps in relief printed in colors a press mold F, Fig. 4, for the relief of that portion of the earth which it is desired to represent is produced in any suitable plastic material by one of the usual processes and to the desired scale. For this mold a corresponding counter-mold G, Fig. 3, is made.

In the hollow mold F there is engraved a series of meridian and parallel contours in sufficient number to produce a sufficiently close network, and an adhesive coloring matter is introduced into these engraved lines. Then a perfectly flat sheet of caoutchouc M is fixed without tension over the top surface of the mold and then by means of the counter-mold G there is exerted upon the sheet of caoutchouc a pressure such as to cause the latter to come into close contact with all the surfaces of the hollows in the mold F.

When the counter-mold and press mold have been brought together, there remains between them only the thickness of the sheet of caoutchouc, and when the latter is relieved of pressure it becomes flat again and bears a distorted projection of the network formed by the meridians and parallel contours. This distorted network serves as a guide for drawing the geographical features thereon. This drawing is reproduced by one of the usual processes for producing a number of printed copies. The reproductions are printed in one or more colors on sheets of caoutchouc which are exactly similar to the original sheet. Then one of the printed sheets of caoutchouc is placed on a mold similar to the press mold F, that is, having the same cavities and the same reliefs, but without the engraved meridians or contours. The sheets are then pressed into the mold by a core, corresponding in shape to counter-mold G, made of card-board, hardened paper, hardened caoutchouc, metal, or any other suitable strong material and previously coated with some suitable adhesive substance. When, after having exerted pressure, it is considered that the adhesive substance on the core has taken a firm hold of the sheet it is merely necessary to remove the core with the adhering relief from the hollow mold and thus obtain a map in one or more colors. This process allows of reproducing any number of copies.

The process may obviously be applied to the manufacture of objects in relief other than geographical maps.

Having thus particularly described and ascertained the nature of my said invention and the best means I know of carrying the same into practical effect I claim:—

1. A process for the production of maps on a non-plane surface which consists in engraving on the walls of a mold for said map surface, a series of latitude and longitude lines forming a network, placing a sheet of caoutchouc over the mold, pressing said sheet into said mold by means of a counter-mold thereby obtaining an imprint of the net work, withdrawing the counter-mold and sheet from the press mold completing the map with the aid of such latitude and longitude lines as guides, and fixing the sheet on the upper surface of a smooth-walled finishing mold, pressing the sheet by means of a core, previously coated with a suitable adhesive substance, into said smooth-walled mold, and withdrawing said core as soon as the sheet has become adhered thereto, thereby forming a map with a network of lines, substantially as described.

2. A process for the production of maps on a non-plane surface which consists in engraving on the walls of a mold for said map surface, a series of latitude and longitude lines forming a network, placing a sheet of caoutchouc over the mold, pressing said sheet into said mold by means of a counter-mold thereby obtaining an imprint of the network; withdrawing the counter-mold and sheet from said press mold, employing the flat distorted projection of said network as a templet for delineating on the sheet the requisite features, reproducing on sheets of caoutchouc in one or more colors copies of said imprinted sheet by means of some suitable printing process, fixing one of said copies on the upper surface of a smooth walled finishing mold, pressing said copy by means of a core previously coated with a suitable adhesive substance into said smooth walled mold, and withdrawing said core when the said copy has become adhered thereto, thereby forming a copy of a map in one or more colors, substantially as described.

3. A process for the production of contour maps which consists in engraving on the walls of a mold for said map surface a series of latitude and longitude lines forming a network, placing a sheet of caoutchouc over the mold, pressing said sheet by means of a corresponding counter-mold into said mold, thereby imprinting the sheet with an imprint of the network, withdrawing the counter-mold and sheet from said press mold, delineating on the distorted network the requisite features, printing in one or more colors on sheets of caoutchouc copies of said imprinted sheet, fixing one of said copies on the upper surface of a smooth walled finishing mold, pressing said copy by means of a core previously coated with a suitable adhesive substance, into the said smooth-walled mold, and withdrawing said core when the copy has become adhered thereto, thereby forming a copy of a map in one or more colors and also in relief, substantially as described.

4. A process for producing an image upon a non-plane surface, which consists in providing the walls of a mold for said surface with suitable guide lines, taking an impression of said mold and guide lines, withdrawing said impression from the mold, completing the image with the aid of said guide lines upon said impression and pressing said completed image together with an adhesive core into a smooth-walled mold corresponding in shape to that first used, and withdrawing said core and image after they have become united.

5. A process for producing an image upon a non-plane surface, which consists in providing the walls of a mold for said surface with suitable guide lines, taking an impression of said mold and guide lines, withdrawing said impression from the mold, completing the image with the aid of said guide lines upon said impression, reproducing said completed image by means of some suitable printing process, and pressing one of said copies together with an adhesive core into a smooth-walled mold corresponding in shape to that first used and withdrawing said core and copy after they have become united.

In testimony whereof I have signed my name to this specification in the presence of two subscribing witnesses.

ANDRÉ PATESSON.

Witnesses:
EMILE NUYBS,
GREGORY PHELAN.